United States Patent [19]

Miller

[11] 4,375,935

[45] Mar. 8, 1983

[54] LIFTING AND TRANSPORTING APPARATUS

[76] Inventor: David Miller, Rte. #1, Box 139, Knox, Ind. 46534

[21] Appl. No.: 281,058

[22] Filed: Jul. 7, 1981

[51] Int. Cl.³ .............................................. B65G 7/12
[52] U.S. Cl. .................................................... 414/454
[58] Field of Search .............................. 414/445–456, 414/490

[56] References Cited

U.S. PATENT DOCUMENTS

| | | | |
|---|---|---|---|
| Re. 2,804 | 11/1867 | Humes | 414/453 |
| 70,303 | 10/1867 | Whipple | 414/453 |
| 533,069 | 1/1895 | Long | 414/455 |
| 757,793 | 4/1904 | Vickers | 414/455 |
| 851,164 | 4/1907 | Davenport | 414/455 |
| 1,470,526 | 10/1923 | Cade | 414/455 |
| 2,447,435 | 8/1948 | Settle | 414/455 |

*Primary Examiner*—Robert G. Sheridan
*Attorney, Agent, or Firm*—Norman B. Rainer

[57] ABSTRACT

The lower extremity of the handle means of a hand truck is pivotably associated with an axle of a pair of wheels. A frame, disposed in front of said handle means, is also pivotably associated with said axle. Elongated curved securing means are pivotably supported by a fork which spans said frame. A lever arm pivotably interconnecting the rearward extremity of said securing means and said handle means enables said securing means to be raised when the handle means is moved forward, and lowered onto cargo objects when said handle means is moved rearwardly.

6 Claims, 4 Drawing Figures

LIFTING AND TRANSPORTING APPARATUS

BACKGROUND OF THE INVENTION

This invention concerns apparatus for handling relatively heavy objects and relates more particularly to a manually operable apparatus of a hand-truck nature adapted to lift and transport relatively heavy cargo objects.

Hand-trucks are in widespread use for the manual lifting and transporting of heavy objects such as drums, barrels, logs, spools, bales, boxes, rocks, bagged products, etc. The hand-truck may in general be characterized as having an upright handle portion, a pair of wheels symmetrically disposed about the base of the handle portion, and a lifting extension affixed to the base of the handle portion, and extending forwardly at an angle thereto. In use, an object is caused to be placed above the lifting extension while the handle portion is in its most erect position. The handle portion is then tilted downwardly and rearwardly in pivotal motion about said wheels. Such action causes the object to be lifted onto said lifting extension and cradled in the region of said angle, thereby placing the entire weight of the hand-truck and cradled object upon said wheels, whereupon the hand-truck and its cargo can be easily pushed or pulled to a desired location.

In its downward motion, the handle portion functions as a lever acting about the axis of the wheels as a fulcrum. The length of the lifting extension and the angle of attachment to the handle portion are further determinants of the effectiveness of the handle portion as a lifting lever. The use of various types of accessory hook devices has been disclosed for preventing the cargo from falling off the hand-truck during movement thereof. Such hook devices are generally attached to the handle portion and require separate setting operations to grip and then release the cradled cargo. The hook devices generally do not assist in lifting an object onto the hand-truck, and the hand-trucks are not generally designed to raise the cargo a significant height above the ground.

It is accordingly an object of the present invention to provide a hand-truck equipped with securing means adapted to hold an object carried by said hand-truck.

It is a further object to provide a hand-truck of the aforesaid nature wherein said securing means automatically engages and releases an object carried by said hand-truck.

It is another object of this invention to provide a hand-truck of the aforesaid nature having securing means which aids in the lifting of an object onto said hand-truck.

It is a still further object of the invention to provide a hand-truck of the aforesaid nature capable of lifting the cargo a significant height above ground level.

These objects and other objects and advantages of the invention will be apparent from the following description.

SUMMARY OF THE INVENTION

The above and other beneficial objects and advantages are accomplished in accordance with the present invention by an improved hand-truck which comprises elongated handle means having an upper extremity adapted to be grasped for manipulative purposes, and a lower extremity pivotably associated with an axle extending between a pair of wheels, a frame comprised of paired lifting extensions having forward extremities adapted to be positioned below the object to be lifted, and rearward extremities pivotably supported by said axle, a fork member mounted to said paired extensions in spanning relationship therewith and extending thereabove, and securing means in the form of a curved tine of downwardly concave configuration pivotably supported adjacent its rearward extremity by said fork in a manner permitting movement of said tine in a vertical plane that bisects said axle, and a lever arm pivotably joined adjacent its forward extremity to said tine below the site of support of said tine by said fork, the rearward extremity of said lever being pivotably associated with said handle means, said tine and lever arm being in substantially coplanar disposition.

In operation, when the upper extremity of said handle means is placed in its forwardmost position, the forward extremity of said tine is upraised. When the upper extremity of said handle means is pivoted to its rearward-most position, the forward extremity of said tine is pivoted to a lower position. In said lower position the tine is adapted to contact an object resting on said paired extensions. When said object is of circular cross-section, it is preferable that the degree of arc between the sites on said circular cross-section contacted by said tine and said paired extensions, measured in the direction of said handle means, exceeds 180°.

BRIEF DESCRIPTION OF THE DRAWING

For a fuller understanding of the nature and objects of the invention, reference should be had to the following detailed description taken in connection with the accompanying drawing forming a part of this specification and in which similar numerals of reference indicate corresponding parts in all the figures of the drawing.

DESCRIPTION OF THE PREFERRED EMBODIMENT

Figure 4:
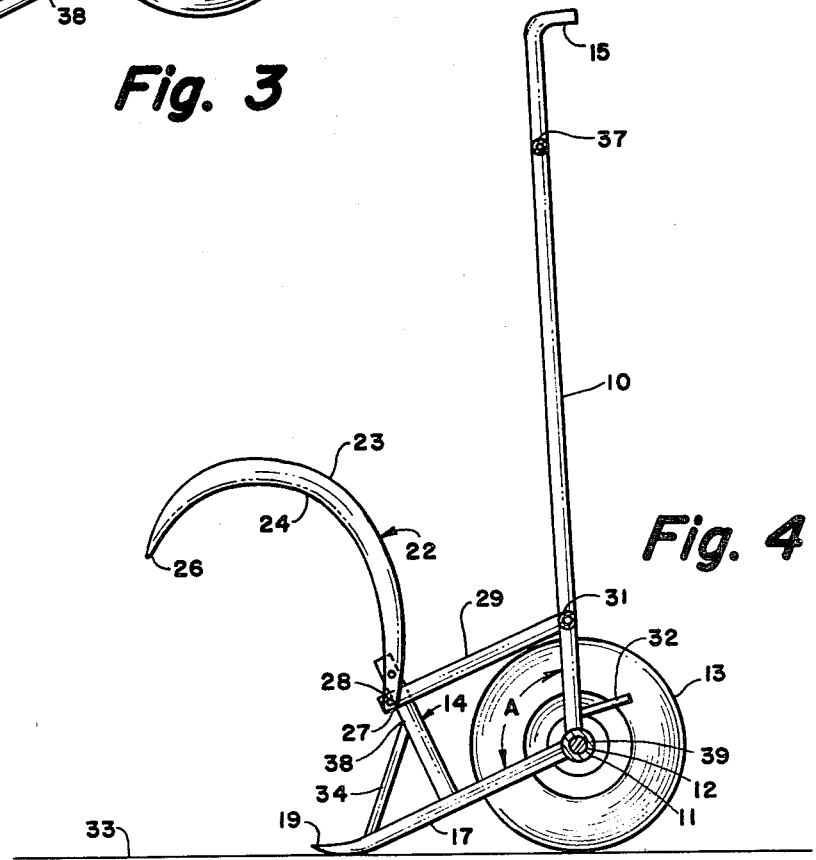
FIG. 4 is a view similar to that of FIG. 3 showing an embodiment having a larger tine positioned upwardly, and several optional features.

Referring to the drawing, an embodiment of apparatus of the present invention is shown consisting of handle means in the form of paired tubular metal handle members 10 pivotably attached at their lowermost extremities by means of U-bolts 35 and associated locking nuts 36 to bushing 11 which pivotably engages axle 12 joining wheels 13. It is to be noted that the paired handle members angle from each other as they extend upwardly, yet remain symmetrically disposed about center vertical plane 3—3. The uppermost extremities of handle members 10 are provided with hand grip portions 15. Lower bracket 31 and upper bracket 37 span handle members 10 in welded engagement therewith to strengthen said handle means. Although said handle members are shown to be pivotably associated with axle 12 by means of said U-bolts, equivalent alternative means for establishing said pivotable association may be employed. For example, the lowermost extremities of the handle members may be fixedly attached to a second bushing 39 rotatively mounted on bushing 11, as shown in FIG. 4.

The frame 16 of the illustrated embodiment is comprised of paired lifting extensions in the form of pipes 17, the rearward extremities of which are welded to bushing 11 which engages axle 12. The forward extremities 19 of said lifting extensions may be downwardly tapered as shown in FIG. 4, to facilitate insertion thereof below cylindrical objects lying on the ground. A fork 14 is attached to said lifting extensions in spanning engagement therewith, said fork being comprised of facing upright members 20, the lower extremities of which are welded or otherwise fixedly attached to said lifting extensions. Said upright members are centered in a plane perpendicular to said lifting extensions and preferably slightly closer to the rear than the front extremities thereof. The front faces 38 of fork 14 constitutes an abutment surface against which the cargo may rest.

A bolt 21 spans said upright members adjacent their upper extremities. Said bolt serves as a transverse strut which fixes the spacing between upright members 20, and also serves as a pivoting support for securing means in the form of curved tine 22. Said tine may be characterized as having an upper side 23, lower side 24, a forwardly disposed tip extremity 26 and a rearward extremity 27. Said lower side is provided with a curved configuration, the nature of the curve being approximately an arc of a circle whose center is disposed below lower side 24. The curve may therefore be said to be concave in the downward direction. In preferred embodiments, the forwardmost portion of lower side 24 may have a more pronounced downward curvature, thereby forming a hook-like gripping portion adjacent tip 26. The upper side 23 of tine 22 may have any contour which will impart adequate strength, light weight and operability to said tine. A preferred contour of upper side 23 is a curved one which substantially parallels the contour of lower side 24 and causes formation with said lower side of pointed tip 26 which is downwardly oriented. The length of said tine measured linearly between said tip and rearward extremity 27 is preferably larger than the diameter of wheels 13. Said tine, adjacent its rearward extremity 27, is connected by pivot bolt 28 to the forward extremity of lever arm 29. The rearward extremity of said lever arm is pivotably attached to U-bolt 30 connected to lower bracket 31 extending between handle members 10 at an elevation just above wheels 13. The general disposition of lever arm 29 is such that it is substantially coplanar with said tine. The overall length of said tine and its manner of attachment to said fork is such that, in its forwardmost disposition, tip 26 preferably extends in front of the forward extremities of said lifting extensions. In alternative variations, the forward extremity of tine 22 may be bifurcated or have other configurations specially adapted for the handling of particular cargos. The tines may also be adapted to be interchangeable with other tines.

Certain optional features may be added to the apparatus, for example, a foot lever 32 may be connected to handle members 10 in spanning engagement therewith at the lower rear side of said members. Paired angled abutment members 34 may extend between upper portions of said fork and forward portions of said lifting extensions, their purpose being to provide an abutment surface for the engaged cargo. In the absence of such abutment members, the front face 38 of fork 14 serves as the abutment surface against which the cargo rests.

The overall construction of the apparatus of this invention may be of wood, metal, plastics and combinations thereof. The frame portion is preferably fabricated of pipe stock, in which case auxiliary extensions of varying lengths and shapes may be removably added to the forward extremities of said lifting extensions to accommodate cargos of various shapes.

In operation, the apparatus is pushed by said handle means until the forward extremities 19 of lifting extensions 17 are substantially below an object to be lifted, and positioned essentially at ground level 33, as shown in FIG. 4. In this position, said handle means are in their forwardmost position with respect to said lifting extensions, as may be measured by Angle A in FIG. 4. In said position, lever arm 29 is forwardly displaced, causing tine 22 to be in an upright position. The handle means are then pulled downwardly, causing Angle A to become more obtuse, while wheels 13 are maintained stationary. Such downward motion of the handle means causes lever arm 29 to move rearwardly, causing downward motion of tine 22 and engagement of the cargo object by tip 26. Such disposition of the apparatus with respect to the cargo object is designated the Engagement Position in FIG. 3.

Figure 1:
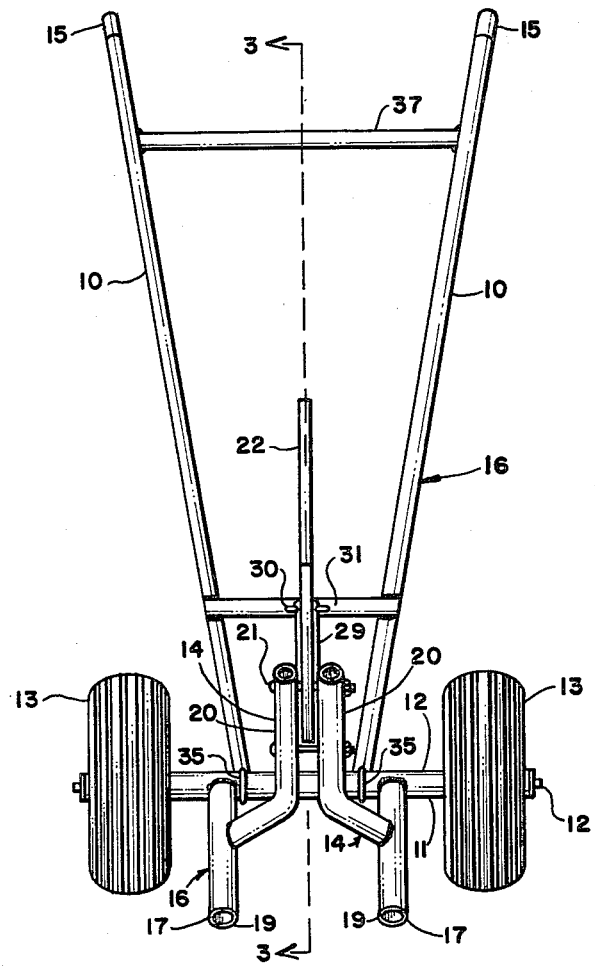
FIG. 1 is a front view of an embodiment of the apparatus of the invention.
Figure 2:
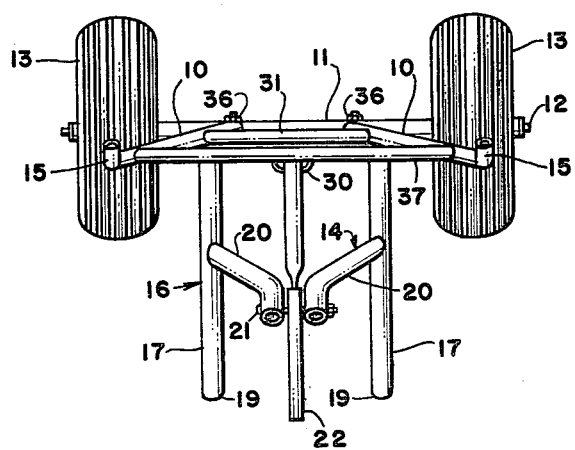
FIG. 2 is a top view of the apparatus of FIG. 1.
Figure 3:
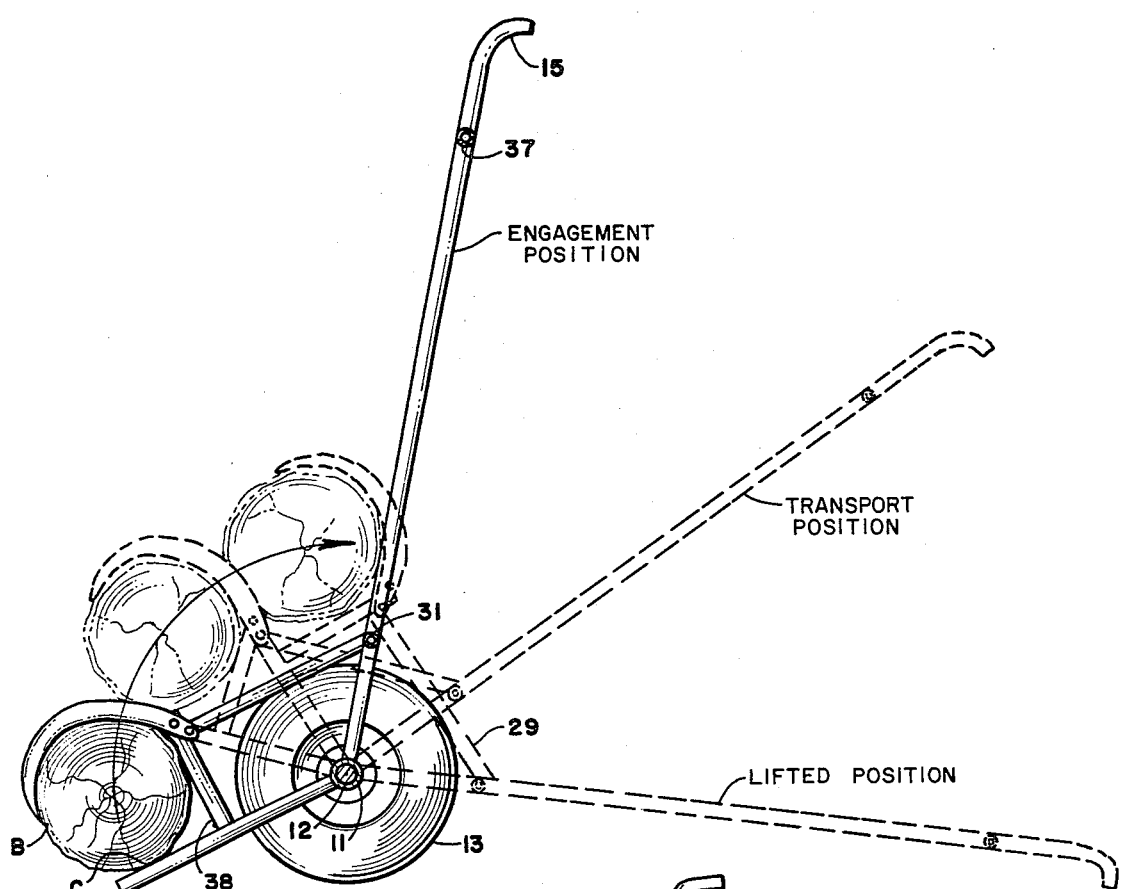
FIG. 3 is a sectional side view taken along the line 3—3 of FIG. 1, showing a log cradled by the apparatus, and the apparatus in three stages of lifting of said log.

It is to be noted in FIG. 3 that the degree of arc between the site B at which tip 26 contacts the cradled cargo object and the site C at which the cargo object contacts the lifting extensions is greater than 180°, measured in the direction of the handle means.

Further downward motion of the handle means does not change angle A, but instead causes upward tilting of the frame. This mode of disposition of the apparatus with respect to its cargo, designated the Transport Position in FIG. 3, enables the apparatus and the cargo to be easily pushed or pulled to a desired place for unloading. At the place of unloading, the handle means may be lowered, causing the cargo to be lifted further above the ground, as shown in the Lifted Position in FIG. 3. In said Lifted Position, the handle means can be moved upward without affecting the position of the frame but with the effect of raising the tine and thereby releasing the cargo. The lifting effect, shown by the curved arrow in FIG. 3, is an important advantage of the apparatus of this invention. The magnitude of lifting is dependent primarily upon the radius of wheels 13, and the leverage distance between the center of axle 12 and the abutment surface such as the front face of fork 14 or abutment members 34. Said leverage distance is preferably between 1.1 and 3.0 times the radius of wheels 13.

When the apparatus is utilized merely for the transporting of objects without attendant lifting, the apparatus will appear as shown in FIG. 4 when it discharges its cargo. In such instance, the handle means are in upright position, as is the tine, and the apparatus is essentially ready to engage another cargo object.

While particular examples of the present invention have been shown and described, it is apparent that changes and modifications may be made therein without departing from the invention in its broadest aspects. The aim of the appended claims, therefore, is to cover all such changes and modifications as fall within the true spirit and scope of the invention.

Having thus described my invention, what is claimed is:

1. An improved hand truck for moving cargo objects comprising:

(a) elongated handle means having an upper extremity adapted to be grasped for manipulative purposes, and a lower extremity,
(b) a pair of wheels of equal diameter,
(c) an axle connecting said wheels,
(d) said handle means being pivotably associated adjacent its lower extremity with said axle,
(e) a frame comprised of a pair of lifting extensions having forward and rearward extremities and a fork mounted to said lifting extensions in spanning relationship therewith and extending thereabove, said fork comprising two upright members and a transverse member which fixes the spacing between said upright members, and an abutment surface against which said cargo object rests,
(f) the rearward extremities of said lifting extensions being pivotably supported by said axle,
(g) securing means having a forward extremity, a rearward extremity pivotably supported by said fork, and a curved underside having a downwardly concave configuration,
(h) a lever arm having a forward and a rearward extremity,
(i) the forward extremity of said lever arm being pivotably engaged with said securing means at a site displaced more rearwardly along said securing means from the site of its pivotal support by said fork,
(k) the rearward extremity of said lever arm being pivotably associated with said handle means,
(l) whereby forward or upward pivotal motion of said handle means about said axle causes said securing means to be raised, and rearward or downward pivotal motion of said handle means about said axle causes said securing means to be lowered to a position where it can grip an object to be loaded onto said truck.

2. The hand truck of claim 1 wherein said securing means is a tine of integral construction having a hook-like configuration.

3. The hand truck of claim 1 wherein the cargo object is of substantially circular cross-section, and the degree of arc between the site at which the forwardmost extremity of said securing means contacts said object, and the site at which said object contacts said lifting extension is at least 180°, measured in the direction of said handle means.

4. The hand truck of claim 1 wherein the lower extremity of said handle means forms an angle with the rearward extremities of said lifting extensions, the apex of said angle being the center of said axle.

5. The hand truck of claim 4 wherein said angle increases in magnitude when said handle means is moved rearwardly.

6. The hand truck of claim 4 wherein said angle is greater than 90° when said handle means are in an upright position and the forward extremities of said lifting extension and said wheels are resting upon a flat underlying surface.

* * * * *